3,002,854
TREATMENT WITH TITANIUM ORGANIC COMPOSITIONS

Harold C. Brill, Cranford, N.J., assignor to E. I. du Pont de Nemours and Company, Wilmington, Del., a corporation of Delaware
No Drawing. Filed Apr. 12, 1957, Ser. No. 652,376
7 Claims. (Cl. 117—121)

This invention relates to a new process for treating a solid surface to improve its tendency to bond with other surfaces.

U.S. Patent 2,768,909 to Haslam is concerned with a method for coating solid surfaces (particularly unsupported films) with a clear, transparent, flexible film comprising the hydrolysis product of a titanium ester. The presence of this film on the surface is very effective in improving the tendency of the surface to bond with other surfaces. For example, when an aluminum foil is so coated and then laminated with a dissimilar material, such as polyethylene hot pressed at a temperature near the softening point of the polyethylene, an excellent bond between the metal and the polyethylene can be obtained. This bond is markedly superior in strength to a bond obtained between the same materials in the absence of the titanium oxide coating. The process of applying the hydrolysis product involves the coating of a surface with an organic solution of the titanium ester in such an amount that the final film will be below a certain specified thickness. The solvent is evaporated from the film, and the residual titanium ester is exposed to the moisture in the air whereby it is hydrolyzed to a hydrous titanium oxide which, in the thickness specified, is a continuous transparent and adherent film. The application of an adhesion promoting film by this process is extremely effective, but certain precautions must be observed. Although the process depends upon the use of moisture in the air to hydrolyze the titanium ester on the surface to be treated, the presence of moisture prior to this step results in a premature hydrolysis of the compound so that it no longer is suitable for the coating process. It is therefore necessary that substantially anhydrous, inert solvents, such as volatile hydrocarbon solvents, be used to make up the titanium ester solution. The use of such solvents in turn introduces the hazards of flammability and toxicity to the operation, and it requires recovery steps both from the standpoint of safety and from the standpoint of economics.

It is apparent therefore that there is a need for a process whereby adhesion promoting coatings of a similar character could be applied to surfaces in a system which is essentially aqueous in character.

It is the principal object of this invention to provide a process whereby an effective adhesion promoting film can be laid down from a suitable aqueous solution derived from a titanium compound.

This object and others are accomplished by a method of coating a solid surface with an adhesion promoting film which comprises coating the surface with a dilute aqueous solution of the reaction product of an alkyl titanate and acetylacetone and evaporating the liquid therefrom.

The following flow sheet sets forth the steps of treating a solid surface according to this invention. This flow sheet also shows the subsequent step of bonding a layer of polymeric material to the treated surface.

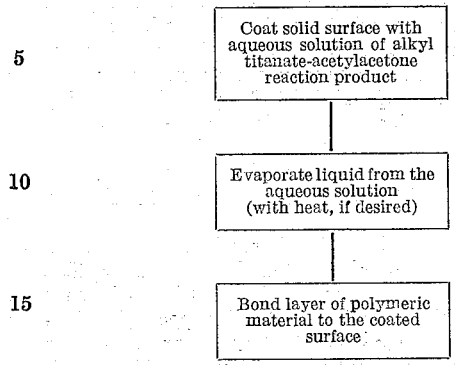

In a preferred embodiment, the residual titanium-containing film is subjected to a heat treatment step. Water vapor should be present during the heat treatment, but no steps have to be taken to insure its presence. The water vapor normally present in the ambient heating atmosphere is sufficient to accomplish this. The heating temperature is not particularly critical as long as the coated material itself is not damaged. Therefore, it is practical to keep the heating temperature below the softening point of the coated material, and preferably in the range of from 75° C.–200° C.

The alkyl titanate-acetylacetone reaction products can be prepared by simply mixing together acetylacetone and an alkyl titanate in the ratio of 1 to 4 mols of acetylacetone per mol of alkyl titanate. The preferred reacting proportions are 2 mols of acetylacetonate per mol of alkyl titanate. A reaction occurs as evidenced by the evolution of heat and the production of a by-product alcohol corresponding to the alkyl group in the titanium. The reaction mixture is a liquid containing an alkyl titanate-acetylacetone reaction product and an alkyl alcohol corresponding to the alkyl groups in the ester used as the reactant. The alcohol can be removed by distillation, but it is preferred to leave it in the solution. The reaction mixture forms a precipitate which is unusable in this invention when added to water in amounts which exceed 2% or 3%. My concurrently filed application Ser. No. 652,375 is concerned with preparing more concentrated, aqueous solutions of the reaction mixture in which the latter may form as much as 75% by weight of the solution without undesirable precipitation. This is accomplished by an adjustment of the pH of the solution to below about 4.5 by the addition of a water-soluble acid, such as acetic, hydrochloric, formic or propionic acid. In this invention the concentration of the reaction mixture is often below 5% so that it is possible in many cases to add the desired amount of reaction mixture to water. However, it has been found that any tendency towards precipitation is eliminated if the more concentrated acidic solutions of my copending application are first prepared and then diluted to the desired concentration with water or a water-miscible solvent, such as a low boiling alcohol. The coating of the surface with the solution requires that the concentration of the solution be about 5% or below and preferably in the range of .25% to about 1%. The aqueous media in which the titanium-containing reaction product is dissolved is not critical so long as the reaction product is stable in the aqueous media and it is sufficiently volatile to be evaporated after the solution is applied. It should be noted that the claimed process can use aqueous coating solutions containing a stabilizing acid, added alcohol, excess acetylacetone or by-product alcohol from the reaction between the alkyl titanate and acetylacetone. The solutions may be applied to the surface to be treated by simply passing the film through a bath of the liquid followed by a suitable draining period, or it may be applied to the film by conventional coating devices such as a gravure type press which applies a film of a definite thickness. The next step involves simply heating the film at an elevated temperature which can readily be accomplished by passing the film through a tunnel drier or other conventional heating apparatus. The time of exposure to the heat may range from a few seconds to several minutes at temperature in the range of 100° C. up to the softening point of the supporting film. It is also possible to use heat in the evaporating step. Evaporation can usually be accomplished with a contact time of about 30–60 seconds at 105° C. but various other conditions will also suffice.

The process of this invention is particularly useful on glass, paint, metal, ceramics, polyamides, polyester films and fibers, cellulosic films, and the like. It is particularly suitable for treating metals and flexible packaging materials such as cellophane and "Mylar." It prepares these materials so that they may be tenaciously bonded to such polymeric films as polyethylene.

For a clearer understanding of the invention, the following specific examples are given. These examples are intended to be merely illustrative of the invention and not in limitation thereof. Unless otherwise specified all parts are by weight.

*Example I*

284 parts (one mol) of tetraisopropyl titanate is added to 200 parts (two mols) of acetylacetone. On thorough agitation considerable heat develops in the solution which becomes yellow to brown in color. Agitation is continued until no further heat is developed and then the solution is cooled to approximately room temperature. 50 parts of the reaction mixture thus obtained is added to 50 parts of a 10% solution of acetic acid in water to give a clear brown solution having a pH of about 4.1. This stable solution is further diluted with 580 parts of isopropanol (95% purity). A thin film of this solution is applied to a "Mylar" polyester film using a gravure press. The film is then passed through a tunnel drier to evaporate the solvent and to cure the titanium-containing reaction product which has been coated on it. The actual conditions in the tunnel drier approximate a contact time of about 30 seconds at a temperature of about 105° C. Subsequently, polyethylene is extrusion laminated to the treated side of the polyester film. The resultant laminate has a superior bond when compared to a similar laminate prepared without the use of the titanium-containing reaction product as an adhesion promoter. This superiority is demonstrated by immersing test strips of the respective films in boiling water. The laminate prepared without the use of the adhesion promoter starts to separate within one minute in boiling water and is completely separated within about 5 minutes. On the other hand, the laminate prepared with the adhesion promoter shows no signs of separation after 15 minutes in boiling water.

*Example II*

20 parts of acetylacetone is dissolved in a mixture of 45 parts of water and 5 parts of glacial acetic acid. Under good agitation, 28.4 parts of tetraisopropyl titanate is added to this solution, and agitation is continued for 30 minutes until all of the precipitated solids have redissolved. This solution is then diluted with 450 parts of water and 450 parts isopropyl alcohol. An aluminum panel is dipped approximately half way into this solution and allowed to drain. It is then cured by hanging in an oven maintained at 100° C. for 15 minutes. Subsequently, a 10 mil thick strip of polyethylene film is bonded to one side of the panel in a heated press, using 10 lbs. per square inch pressure at 150° C. The panel was removed from the press and allowed to stand at room temperature (25° C.) for one hour. This panel was then tested for the effectiveness of the adhesion between the polyethylene layer and the aluminum by attempting to peel the layer from the metal panel. A pull of 2 lbs. per linear inch (calculated from the width of the polyethylene layer and the force required to peel off the layer) removed the layer from the untreated portion of the panel whereas it required a pull of 8 lbs. per linear inch to loosen the layer from the treated portion of the panel.

*Example III*

228 parts (one mol) of tetraethyl titanate is added to 300 parts (three mols) of acetylacetone. On thorough agitation, some heat develops in the solution together with an appreciable amount of color. Agitation is continued until no further heat is developed, and then the solution is cooled approximately to room temperature and added to 500 parts of a 10% acetic acid solution in water to give a clear stable reaction mixture. This stable solution is further diluted with 5800 parts of ethyl alcohol (95% purity) and the resulting solution is applied in a thin film to a "Mylar" polyester film in the manner described in Example I. A laminate with polyethylene is prepared from this treated "Mylar" film, and it has excellent resistance to separation when tested by immersion in water as described in Example I.

*Example IV*

100 parts of tetraisopropyl titanate-acetylacetone reaction mixture prepared as in Example I is added to 100 parts of 5% acetic acid solution in water to give a stable brown solution which is then further diluted with 1452 parts of water. A thin film of this stable solution is then applied to a continuous web of cellophane (viscose) film using a gravure press. The film is passed through a tunnel drier at about 80° C. to remove solvent and to cure the adhesion promoting film on its surface. Subsequently, a thin film of polyethylene is extrusion coated on to the treated side of the cellophane film. The resultant laminate has a much stronger bond than a similar laminate prepared by extruding polyethylene on to untreated cellophane.

*Example V*

One-half (½) mol of tetraisopropyl titanate was added to one mol of acetylacetone with agitation. Two (2) grams of the resulting reaction mixture were added to 2 grams of 10% acetic acid in water. With agitation the solution became clear after a few seconds. To the resulting solution were added 800 grams of distilled water.

An oriented heat-stable polyethylene terephthalate film (½ mil in thickness) was continuously passed into the solution and then between two doctor rolls to wipe off excess of the coating solution. The resulting coated film was dried in a tower heated with circulating hot air, and the surface of the film emerging from the tower was about 125° C. The resulting film contained a very thin coating of the adhesion promoting titanium compound. The film was then passed between a rubber press roll and a water-cooled stainless steel roll. An extrusion apparatus having a slot-shaped dye was positioned directly above the bite of the rolls, so that a molten stream of polyethylene (about 1½ mil thickness) at 290° C. flowed into the bite of the rolls and into contact with the film to give a coating of about 1½ mil thickness. The heat seal strength of the resulting coated film, when sealing the coated side to the coated side, was at least 20 times greater than that of the same type of coated film obtained with an untreated (no titanate) polyethylene terephthalate film.

Example VI

Regenerated cellulose film approximately 0.0013" thick, pretreated with a guanidine-urea-formaldehyde resin as described in Example 1 of Chapman U.S. Patent 2,533,557, was impregnated with a 5% titanium acetylacetonate solution in water and then dried at 140° C. for 30 seconds. The dried impregnated film was then coated (4 grams/m.²) with a polyethylene/cyclized natural rubber/toluene solution (19 parts of polyethylene and 1 part "Pliolite" NR were dissolved in 80 parts of toluene at 90–110° C.) at 90–110° C. and then dried at 140° C. for 30 seconds.

The dried coated film was cut into strips 1.5" in width and about 3" in length. Tests were run by heat sealing two strips together with a metal heat sealing bar (coated with polytetrafluoroethylene) ¾" in width, the bar being maintained at a sealing temperature of about 130° C. The heat seals were made by pressing the bar against superimposed strips under a pressure of 20 p.s.i. and a dwell time of 2 seconds. Some of the sealed strips were conditioned at 35% relative humidity and others were conditioned at 81% relative humidity for 24 hours. The seals were then tested by peeling the strips apart. At 35% relative humidity the force required to separate the films (once a break in the seal was started), pretreated by the process of this invention, was twice as much as the force required to peel the control film samples which were not treated prior to application of the polyethylene coating. At 81% relative humidity, the force required to peel the strips treated in accordance with this invention was about three times that required to peel the control samples which were not treated.

The alkyl titanate-acetylacetone reaction products which furnish the titanium for the adhesion promoting film may be prepared from any of the 2–4 C alkyl titanates, such as tetraethyl titanate, tetra-n-propyl titanate, tetraisopropyl titanate and tetra-n-butyl titanate. It has already been disclosed that the reacting proportions for the titanium ester and the acetylacetone are 1 to 4 mols of the latter per mol of titanium ester. The preferred proportions are 2 mols of acetylacetone per mol of titanium ester.

It is believed that when one mol of alkyl titanate is reacted with 2 mols of acetylacetone

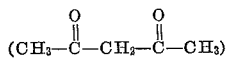

two of the alkoxy groups on the titanium ester are replaced by two chelating

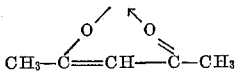

groups to form a reaction product which might properly be called a titanium acetylacetonate. The reaction of either more or less than 2 mols of acetylacetone is not as thoroughly understood, but with less than two mols of the beta-diketone a proportionate number of alkoxy groups are replaced. When more than two mols of acetylacetone are used, it is believed that additional alkoxy groups are replaced; but since the titanium coordination sphere is already filled, further chelation cannot occur. There is evidence that as much as 4 mols of acetylacetone will react with a mol of titanium ester. Moreover, the coating solutions may contain excess acetylacetone without any harmful effects.

When the material being treated is reactive with the titanium-containing reaction product (e.g., surfaces composed of a material containing free hydroxyl groups may enter into a reaction with the titanium-containing product), the solution may contain up to 20% by weight of the reaction mixture. For most of the purposes of this invention, the reaction mixture from the alkyl titanate-acetylacetone reaction is directly used in the coating solution in amount of ⅛% to 10% by weight, with a range of from ¼% to 1% being preferred. When the solutions contain over 2% or 3% of reaction mixture, they should be stabilized by adjusting the pH to below 4.5, as shown in the examples and in my concurrently filed application Ser. No. 652,375. The order of mixing the coating solution is not critical, but if the alkyl titanate is directly mixed with water, the acetylacetone and the acid (if the latter is being used) should be promptly added so as to prevent the formation of an insoluble precipitate.

As heretofore explained, alcohol is split off when the alkyl titanate and acetylacetone are reacted, and the whole reaction mixture comprising the alcohol and the reaction product is preferably used to prepare the coating solution. However, it is entirely possible to remove this alcohol, by suitable distillation techniques, to obtain the separated alkyl titanate-acetylacetone reaction product. The concentrations given above for the reaction mixture are also applicable when preparing solution with the separated reaction product.

The application of these solutions to the surface to be treated can be carried out in any convenient manner. Thus, a continuous length of foil may be passed through a bath and allowed to drain in a vertical manner as it is carried over a series of rolls to a drying oven. On the other hand, a film of controlled thickness may be applied by the use of conventional coating equipment. The exact manner in which this is done is not critical, and if solutions of the concentrations listed above are used, the amount of the titanium compound remaining on the surface after the final drying step falls within the desired range for optimum adhesion promotion.

The heating step is, likewise, conventional in nature. The temperature used should be sufficiently high to insure the removal of both the water and residual organic material. The exact manner in which this heating step is carried out is not important. It may be done in a continuous manner on a conventional festoon drier; or when the material is being coated in sheet form, the sheets may be hung in any conventional drier operating at temperatures in the range of 100° C. up to the softening point of the supporting film. If the drying temperature is sufficiently high and sufficiently prolonged, it is highly probable that the film remaining is substantially pure titanium dioxide.

There are many advantages in using the adhesion-promting process of this invention. For instance, packaging materials of aluminum foil or polyethylene terephthalate films are not readily heat-sealable. On the other hand, both of these materials have good tensile strength and are substantially impermeable to moisture and air. By laminating to these packaging materials an extremely thin layer of polyethylene, it is possible to obtain heat sealability. However, heretofore it has not been practical to make such a laminate because the polyethylene would not satisfactorily adhere to either of these supporting films, particularly when the laminate was exposed to moisture. The application of the adhesion-promoting films of this invention to these surfaces has enabled a satisfactory laminate to be formed. Moreover, the use of water solutions of the titanium-containing reaction product has made it possible to carry out these operations with conventional equipment.

Since it is obvious that many changes and modifications can be made in the above-described details without departing from the nature and spirit of the invention, it is to be understood that the invention is not to be limited to said details except as set forth in the appended claims.

I claim:
1. A process of treating a solid surface which comprises applying to the surface a stable, dilute aqueous solution containing about ⅛% to 20% by weight of a reaction product obtained by reacting in the ratio of 1 to 4 mols of acetylacetone with 1 mol of an alkyl titanate having 2–4 carbon atoms in the alkyl group, and after applying said solution, evaporating the liquid therefrom.

2. The process of claim 1 wherein the solution contains from ⅛% to 10% by weight of titanium-containing reaction product.

3. A process of treating a solid surface which comprises applying to the surface a stable, dilute aqueous solution containing about ⅛% to 20% by weight of a reaction product obtained by reacting in the ratio of 1 to 4 mols of acetylacetone with 1 mol of an alkyl titanate having 2-4 carbon atoms in the alkyl group, and after applying said solution, evaporating the liquid therefrom, and heating said surface at an elevated temperature but below temperatures which are harmful to the material being treated.

4. A process of treating a solid surface which comprises applying to the surface a stable, dilute aqueous solution containing about ⅛% to 20% by weight of a reaction product obtained by reacting the ratio of 2 mols of acetylacetone with 1 mol of an alkyl titanate having 2-4 carbon atoms in the alkyl group, and after applying said solution, evaporating the liquid therefrom.

5. A process of treating a solid surface which comprises applying to the surface a stable solution containing about ⅛% to 20% by weight of the reaction product obtained by reacting in the ratio of 1 to 4 mols of acetylacetone with 1 mol of an alkyl titanate having 2 to 4 carbon atoms in the alkyl group, said solution having as its solvent a mixture of water and a water-miscible liquid selected from the group consisting of lower boiling alcohols, aqueous acids, acetylacetone and mixtures thereof, and after applying said solution evaporating the liquid therefrom and heating said surface at an elevated temperature but below temperatures which are harmful to the material being treated.

6. The process of claim 5 in which the reaction product is obtained by reacting the alkyl titanate and acetylacetone in the mol ratio of 2 mols of acetylacetone per mol of alkyl titanate.

7. A process of treating a solid surface which comprises applying to the surface a stable, dilute aqueous solution containing about ⅛% to 20% by weight of a reaction product obtained by reacting in the ratio of 1 to 4 mols of acetylacetone with 1 mol of an alkyl titanate having 2-4 carbon atoms in the alkyl group, and after applying said solutions, evaporating the liquid therefrom, heating said surface at an elevated temperature but below temperatures which are harmful to the material being treated, and then bonding a layer of polymeric material to the treated solid surface.

References Cited in the file of this patent

UNITED STATES PATENTS

| | | |
|---|---|---|
| 2,680,108 | Schmidt | June 1, 1954 |
| 2,708,205 | Haslam | May 10, 1955 |
| 2,768,909 | Haslam | Oct. 30, 1956 |
| 2,898,356 | Russell | Aug. 4, 1959 |

FOREIGN PATENTS

| | | |
|---|---|---|
| 734,113 | Great Britain | July 27, 1955 |